April 1, 1958     B. C. CARTER     2,828,615
UNIVERSAL JOINTS

Filed Feb. 7, 1955     3 Sheets-Sheet 1

INVENTOR
Benjamin
Charles Carter
BY
Richardson, David and Morton
ATTORNEYS.

April 1, 1958  B. C. CARTER  2,828,615
UNIVERSAL JOINTS

Filed Feb. 7, 1955  3 Sheets-Sheet 3

INVENTOR
Benjamin Charles Carter
BY
Richardson, David J. Nolan
his ATTORNEYS.

2,828,615
Patented Apr. 1, 1958

2,828,615

UNIVERSAL JOINTS

Benjamin Charles Carter, Farnham, England, assignor to Garringtons Limited, Darlaston, England, a British company Application February 7, 1955, Serial No. 486,639

4 Claims. (Cl. 64—21)

This invention relates to constant velocity universal joints for coupling together rotatable shafts whose axes are arranged in angular relationship, or whose axes are capable of angular divergence, whilst transmitting torque. The invention is concerned with the type of universal joint in which each shaft is provided with transmitting members which have co-operating driving engagement in pairs so that one transmitting member of one shaft co-operates with one transmitting member of the other shaft, the arrangement being such that the instantaneous point of driving engagement between any co-operating pair of transmitting members always lies in a plane which passes through the intersection of the axes of the two shafts and which is symmetrically disposed in relation to the shafts.

The object of the invention is to provide an improved universal joint of the type specified, wherein each one of each co-operating pair of transmitting members carries a separate abutment member having a planar driving face which is maintained in driving engagement with a planar face on the abutment member on the other transmitting member of the pair, both abutment members being mounted on their associated transmitting members for free oscillation in such a manner that the common plane of engagement between the planar faces of the abutment members is always normal to the plane which passes through the point of intersection of the axes of the shafts and is symmetrically situated in relation to the two shafts.

A further object of the invention is to provide an improved universal joint giving kinematically exact constant velocity without backlash and capable of large shaft divergencies whilst providing true lateral support to and allowing limited relative axial movement between the shafts.

In the accompanying drawings, which show by way of example one construction of coupling according to the invention:

Figure 1:
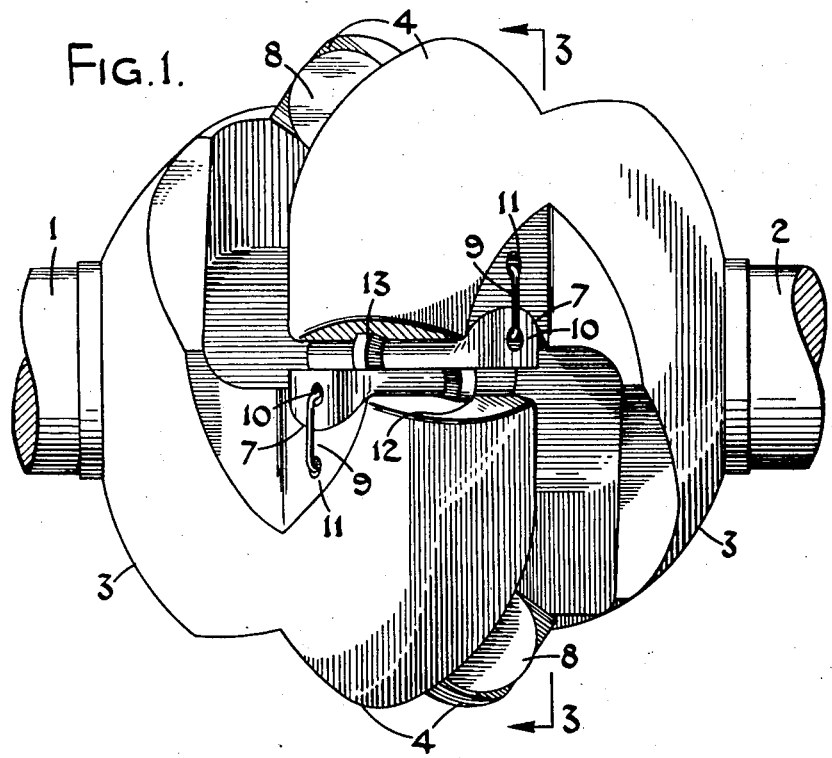
Figure 1 is a side view of a coupling with the driving and driven shafts in alignment.
Figure 2:
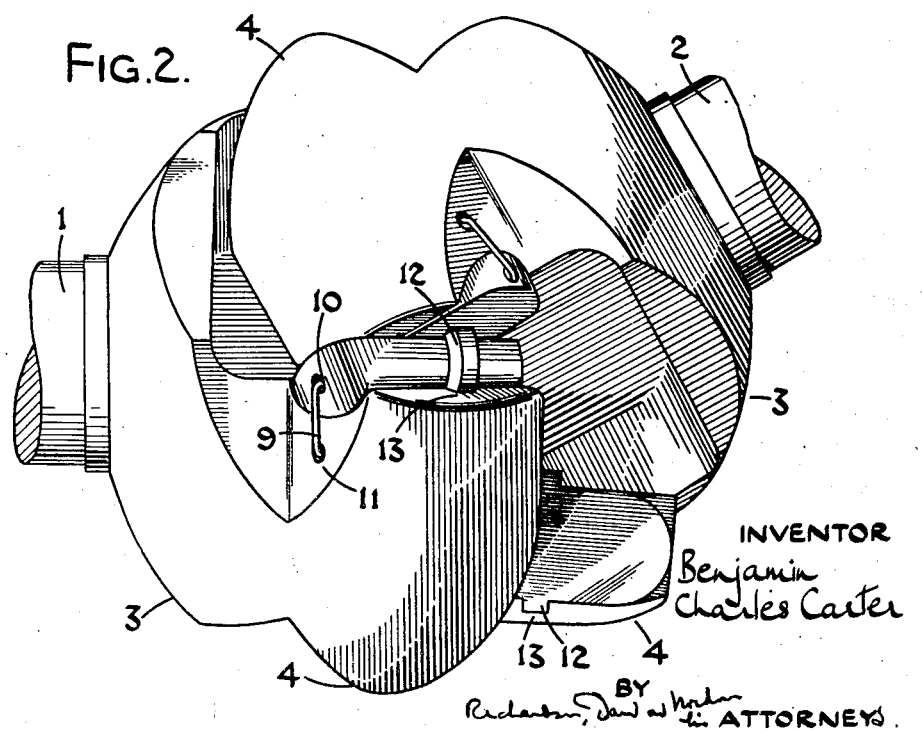
Figure 2 is a side view of the coupling with the driven shaft inclined to the driving shaft.
Figure 3:
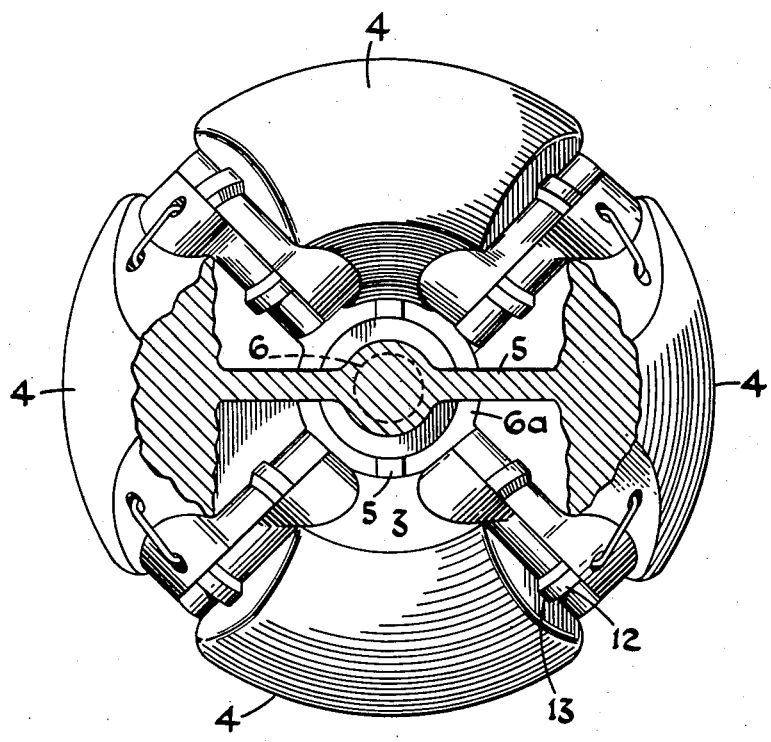
Figure 3 is a section on the line III—III, Figure 1.

As shown in Figures 1 to 3, a driving shaft 1, and a driven shaft 2, are connected by a coupling comprising two similar half couplings secured to the adjacent ends of the shafts. Each half coupling consists of a base unit 3, having extending longitudinally therefrom two branches or horns 4, the side faces of which incline inwardly, the branches of one half being freely accommodated in the spaces between the branches or horns on the other half coupling. A reinforcing web 5, extends between the branches or horns of each coupling, from which web there projects an axial extension 6. The extension 6, on one half coupling, at its foremost or free end, terminates in a concave bearing surface with which engages the free end 6a, of the extension 6, of the other half coupling, which is spherical in form. This ball and socket connection is normally located centrally of the coupling and serves as a thrust device and as the pivot about which the driven member may swing relatively to the driving member. Each branch or horn has formed in its side faces part cylindriform grooves 7, directed inwardly towards the axis of its half coupling and adapted to receive semi-cylindrical bearing pads 8, with flat or planar driving faces, which bearing pads are retained in engagement with the grooves 7, by U-shaped spring clips 9, that engage holes 10, 11 formed respectively in the bearing pads 8, and the branches or horns 4. Despite being so secured to the branches or horns, the bearing pads can turn or oscillate about their axes of oscillation in the grooves 7. They are, however, prevented from moving longitudinally in the grooves by forming about the bearing pads semi-annular flanges 12, that engage semi-circular grooves 13, forming a deeper part of the groove 7 about the middle of its length. When the coupling is assembled the axes of oscillation of the several bearing pads carried by each half-coupling focus at or near the axes of such half coupling whilst the flat faces of co-acting bearing pads carried on adjacent branches or horns on each half coupling closely engage one another and remain co-planal. This common plane of engagement between the planar faces of the abutment members is always normal to the plane which passes through the point of intersection of the axes of the shafts and is symmetrically situated in relation to the two shafts. Rotation of the driving shaft is transmitted through the bearing pads to the driven shaft and as such bearing pads are in close engagement there is no backlash or play in such transmission, which is uniform with the rotation of the driving shaft, so that the driven shaft is rotated at a constant velocity ratio with the driving shaft.

When the driving and driven shafts are in alignment, as shown in Figure 1, the flat faces of the semi-cylindrical bearing pads will be substantially parallel to the adjacent side faces of the branches or horns 4 on which they are carried. Each pair of contacting bearing pads will lie across one another with their axes at an angle of about 80° and will so remain during rotation of the coupling. As the axis of the driven shaft diverges or becomes inclined to the axis of the driving shaft oscillating movement takes place between the branches or horns and their bearing pads during rotation of the coupling, to compensate for variation in angularity between the adjacent side faces of the branches or horns of the two half couplings, and the bearing pads will also slide across and lengthwise of one another whilst the angle between the axes of such pads will also vary. The greater the angle of inclination of the driven shaft to the driving shaft the greater is the extent of oscillation, relative sliding movement and variation of angle between each pair of co-acting bearing pads. The coupling will continue to operate even when the driving and driven shafts are moved part axially so that the extensions 6 of the half couplings are disengaged, provided that such axial movement does not cause the co-acting bearing pads to slide out of engagement with one another.

For ease of manufacture and good design the inclination $\eta$ of the centre line axes of the pads to the axis of rotation of the base unit, the width of the pad and the angle of tilt $\Omega$ of the pads in their grooves on either side of their position when the shafts are colinear are of great importance. From a mathematical analysis of the kinematics of the joint the angle $\Omega$ of tilt of the pads in their grooves has been found to bear some relation to the angle $\eta$, to the maximum shaft divergence angle $\lambda$, and to an angle $\zeta$ defining the rotational position of the shafts. The relation is expressed by the following equation:

$$\operatorname{Cot} \Omega = -\left(\cot \frac{\lambda}{2} \cdot \sin \eta \cdot \sec \zeta + \cos \eta \cdot \tan \zeta\right) \quad (1)$$

In the present instance, $\eta$ is an obtuse angle, making $\cos \eta$ negative; it is an acute angle for branches secured at their inner ends.

The tilt $\Omega$ is a maximum $\Omega m$ when the shaft angular position is given by:

$$\sin \zeta = -\tan \frac{\lambda}{2} \cot \eta \quad (2)$$

whence it can be shown that:

$$\sin \Omega m = \sin \frac{\lambda}{2} \csc \eta \quad (3)$$

If $\Omega m$ were as large as 45°, the pads would not be retained in their grooves so for practical purposes it is well to limit $\Omega m$ to the region of 30° which leads from the above formula to the practical rule that the angle $(180° = \eta)$ should not be less than the angle $\lambda$.

A close upper limit to pad inclination is set by the need to keep adjacent pad grooves on each branch member clear of each other at their inner ends without making the pads undesirably narrow. The analyses have given the following formula for computing this clearance:

Closest approach of pad $= 2(PT) \sin \eta$
$$-\omega \sqrt{1 - \tfrac{1}{2} \sin^2 \eta} \quad (4)$$

where (PT) is the distance of the inner ends of the pad faces from P, the point of convergence on the shaft axis and $\omega$ is the diametral pad width.

In the preferred form of universal joint as illustrated, the grooves in the branch members or in the bearing blocks are cut so that the centre line axes of the pads constitute the contact lines of the abutment elements and are inclined to the axis of rotation of the base units at an angle of 40° and in consequence the geometrical requirements for constant velocity operation are fulfilled and there is virtually no backlash. The pads oscillate in their grooves and slide over each other as the shafts rotate and the shaft axes diverge, the driving force being always normal to the pad face through the intersection point of the centre line axes. The pad ends are preferably semi-circular with centres a little inside the extreme intersection points to give increased web thickness.

This preferred form of universal joint which is particularly intended for use where shaft divergencies greater than 10° are expected, is inherently balanced and gives kinematically exact constant velocity without backlash at large shaft divergencies whilst providing true lateral supports to and allowing limited relative axial movement, between the shafts. Also it gives unvarying reactions on the bearings carrying the shafts under steady conditions of operation.

When it is necessary to give the base unit or half couplings suitable relative endwise location a ball may be held at the centre of the joint in end recesses in a number of plungers acting radially and inwardly from the radial holes in each branch member. The plungers are screwed into the holes and adjusted to locate the ball centrally of the joint in assembling the joint, and screwed out to enable the joint to be dismantled. The coupling can also be modified by forming the grooves 7 and 13 in bearing blocks which can be secured in the branches or horns 4.

It is preferable that the base units, the prongs and the branch members are formed to be or as if to be contained with a sphere in all positions of shaft divergence as this gives a neat and robust joint which if necessary can be provided with a spherical housing should it be necessary to protect the joint from foreign matter and to provide a container or lubricant.

Figure 4:
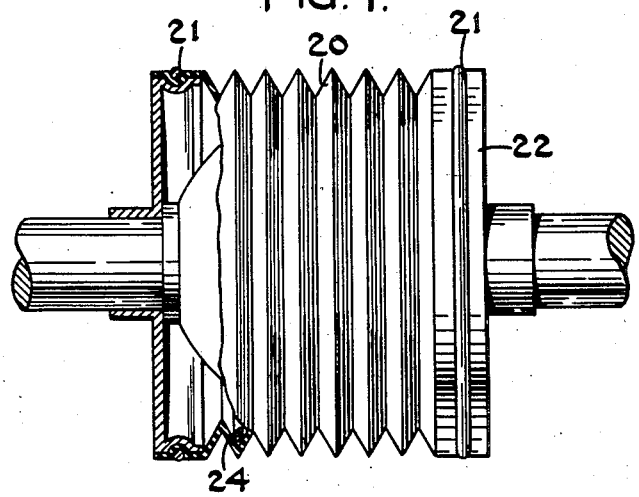
Figures 4 and 5 are elevational views, partly in section of constructions of flexible casings for the couplings.

Such a housing may be of any convenient form but it may as shown in Figure 4, consist of a bellows 20, or rubber, plastic or like material, e. g. of the material marketed under the registered trademark "neoprene," which is secured by clip rings 21 or two plates 22, 23 mounted respectively on the driving and driven shafts. The ridges of the bellows are supported by reinforcing wire hoops 24.

Figure 5:
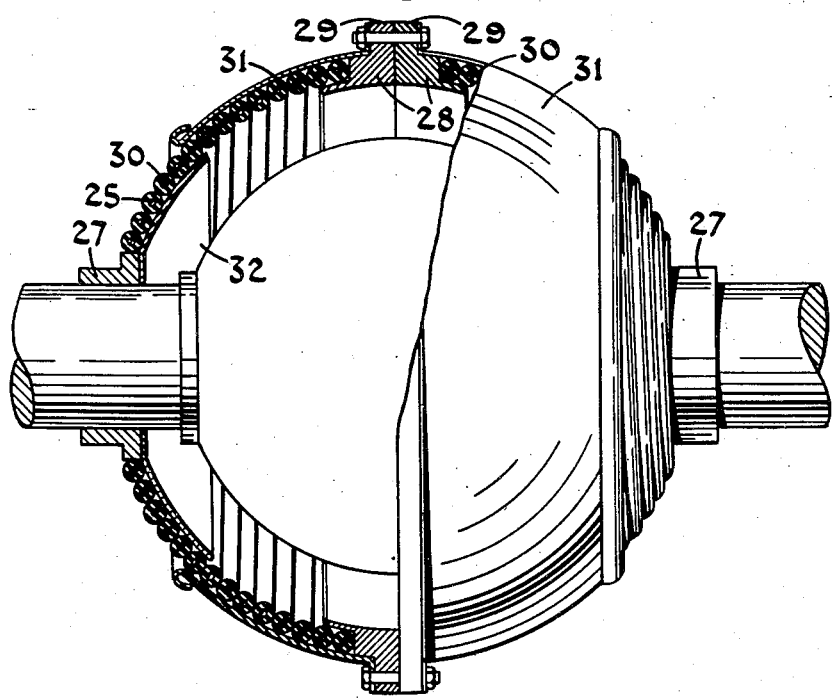

Another form of casing is shown in Figure 5 and consists of tubes 25 of rubber or like material arranged in semi-spherical form with the convolutions vulcanised or otherwise secured to one another. The semi-spherical half-casing members are carried by plates 26, 27 secured respectively to the driving and driven shafts and are secured together by rings 28 to which the largest convolution of each half-casing is respectively connected. These rings are provided with flanges 29 which can be bolted together. A helical wire 30 may be threaded through each semi-spherical half-casing to impart a degree of rigidity thereto whilst frusto-spherical sheet metal members 31 may surround the larger convolutions of each half casing to prevent undue distortion of said half-casings. In like manner the small convolutions of each half-casing may be supported upon a convex support 32. It is preferable that the metal member 31 and the support 32 overlap so that some of the convolutions are disposed between both the member 31 and the support 32.

The quantity of oil present will normally be such as to submerge the bearing surfaces sufficiently even when rotation of the joint causes the oil to be thrown away from the central region of the coupling. For particular instances, e. g. with a non-rotating housing a scoop may be arranged on one or other of the base units to scoop the oil up and throw it on to the bearing pads, or a small pump driven from an internal toothed gear carried on the interior of the joint housing may be used. With a rotating housing, relative motion of the two parts of the joint due to shaft divergence may be employed to direct or pump lubricant inwards to the pads.

What I claim then is:

1. A universal joint for coupling together rotatable shafts comprising two half couplings each having a shaft portion, a base unit connected to the end of the shaft portion, at least two branches extending from said base unit, the branches being angularly spaced about the axis of the shaft portion and each branch being directed first outwardly away from said axis and then inwardly towards said axis, the branches of one half coupling being freely accommodated between the branches of the other half coupling, each branch on its inwardly directed part having opposed side faces which converge inwardly towards said axis, each side face having an elongated part-cylindrical groove formed therein, the axes of all the grooves of one half coupling converging inwardly towards the axis of that half coupling and being convergent in the direction towards the other half coupling, the axes of all the grooves of said other half coupling converging inwardly towards the axis of that half coupling and being convergent in the direction towards said first-mentioned half coupling, and a semi-cylindrical bearing pad having a flat outer face mounted captively in each groove for free oscillation therein, each bearing pad of one half-coupling being in face-to-face sliding engagement with a corresponding pad in the other half-coupling.

2. A universal joint for coupling together rotatable shafts comprising two half couplings each having a shaft portion, a base unit connected to the end of the shaft portion, at least two branches extending from said base unit, the branches being angularly spaced about the axis of the shaft portion and each branch being directed first outwardly away from said axis and then inwardly towards said axis, the branches of one half coupling being freely accommodated between the branches of the other half coupling, each branch on its inwardly directed part having opposed side faces which converge inwardly towards said axis, each side face having an elongated part-cylindrical groove formed therein, each groove being formed with a part-circular recess intermediate its ends, the axes of said grooves converging inwardly towards the shaft axis, and a semi-cylindrical bearing pad having a flat outer face mounted captively in each groove for free oscillation therein, each bearing pad of one half-coupling being in face-to-face sliding engagement with a corresponding pad in the other half-coupling, each bearing pad having a semi-annular flange which engages in said recess.

3. A universal joint for coupling together rotatable shafts comprising two similar half couplings, each half coupling having a shaft portion, at least two branches extending from the end of said shaft portion in directions which are equally spaced angularly around the axis of the shaft portion and are inclined at equal angles to the axis of the shaft portion, the branches of one half coupling being accommodated between the branches of the other half coupling, each branch carrying on opposite sides an elongated bearing pad, mounted on the branch for oscillation about its longitudinal axis and the axes of all the pads of one half coupling converging inwardly towards the axis of that half coupling and being convergent in the direction towards the other half coupling, the axes of all the pads of said other half coupling converging inwardly towards the axis of that half coupling and being convergent in the direction towards said first mentioned coupling, each bearing pad having a flat outer face and being in face-to-face sliding engagement with a corresponding pad in the other half coupling.

4. A universal joint for coupling together rotatable shafts comprising two similar half couplings, each half coupling having a shaft portion, two branches extending from the end of said shaft portion at diametrically opposite positions, each branch being directed first outwardly away from the axis of the shaft portion and then inwardly towards said axis at equal angles of inclination to said axis, the branches of one half coupling being freely accommodated between the branches of the other half coupling, each branch on its inwardly directed part having opposed side faces in each one of which there is captively mounted, for oscillation about its longitudinal axis, an elongated bearing pad, and the axes of all the pads of one half coupling converging inwardly towards the axis of that half coupling and being convergent in the direction towards the other half coupling, the axes of all the pads of said other half coupling converging inwardly towards the axis of that half coupling and being convergent in the direction towards said first mentioned coupling, each pad having a flat outer face and being in face-to-face sliding engagement with a corresponding pad in the other half coupling.

References Cited in the file of this patent
UNITED STATES PATENTS

| 2,617,278 | Sindelar | Nov. 11, 1952 |

FOREIGN PATENTS

| 12,697 | Great Britain | Sept. 14, 1889 |
| 181,531 | Great Britain | June 22, 1922 |